Aug. 13, 1968   J. HUMPHREYS   3,396,513
STEAM AND WATER SEPARATOR
Filed Nov. 21, 1966   2 Sheets-Sheet 1

United States Patent Office 3,396,513
Patented Aug. 13, 1968

3,396,513
STEAM AND WATER SEPARATOR
John Humphreys, London, England, assignor to Babcock & Wilcox, Limited, London, England, a corporation of Great Britain
Filed Nov. 21, 1966, Ser. No. 595,766
4 Claims. (Cl. 55—201)

ABSTRACT OF THE DISCLOSURE

A gas-liquid separator having an annular centrifugal separating chamber positioned within an upright pressure vessel with the liquid discharged downwardly from the separator with the rotary component of liquid motion imparted by inclined vanes within the separating chamber and continued by a helical chute pitched to gradually increase the rotary component of liquid motion until its discharge below the liquid level maintained within the vessel.

---

This invention relates to apparatus for use in separating a gas/liquid mixture, and is particularly applicable to those primarily intended to separate steam from water.

Separators of the latter type are frequently encountered in operation as a component of a forced flow boiler during starting up, shutting down and low load operation of the boiler in a recirculation circuit. During start-up, shut-down or low load operation of a forced flow boiler, pump assisted recirculation may be used and it is necessary to separate the steam generated from the recirculating water. Although it is not essential to achieve very dry steam, a small percentage of water in the steam discharged from the separator being permissible, it is desirable to eliminate steam bubbles from the water returning to the recirculating pump.

According to the invention, there is provided apparatus for use in separating a gas/liquid mixture including a vessel having a separator and adapted in operation to contain below the separator a body of liquid hving an upper surface exposed to gas, in which the separator is arranged to discharge separated liquid downwardly within the vessel and means is provided to impart to separated liquid a component of rotation such that the angle of descent decreases downwardly.

Figure 1:
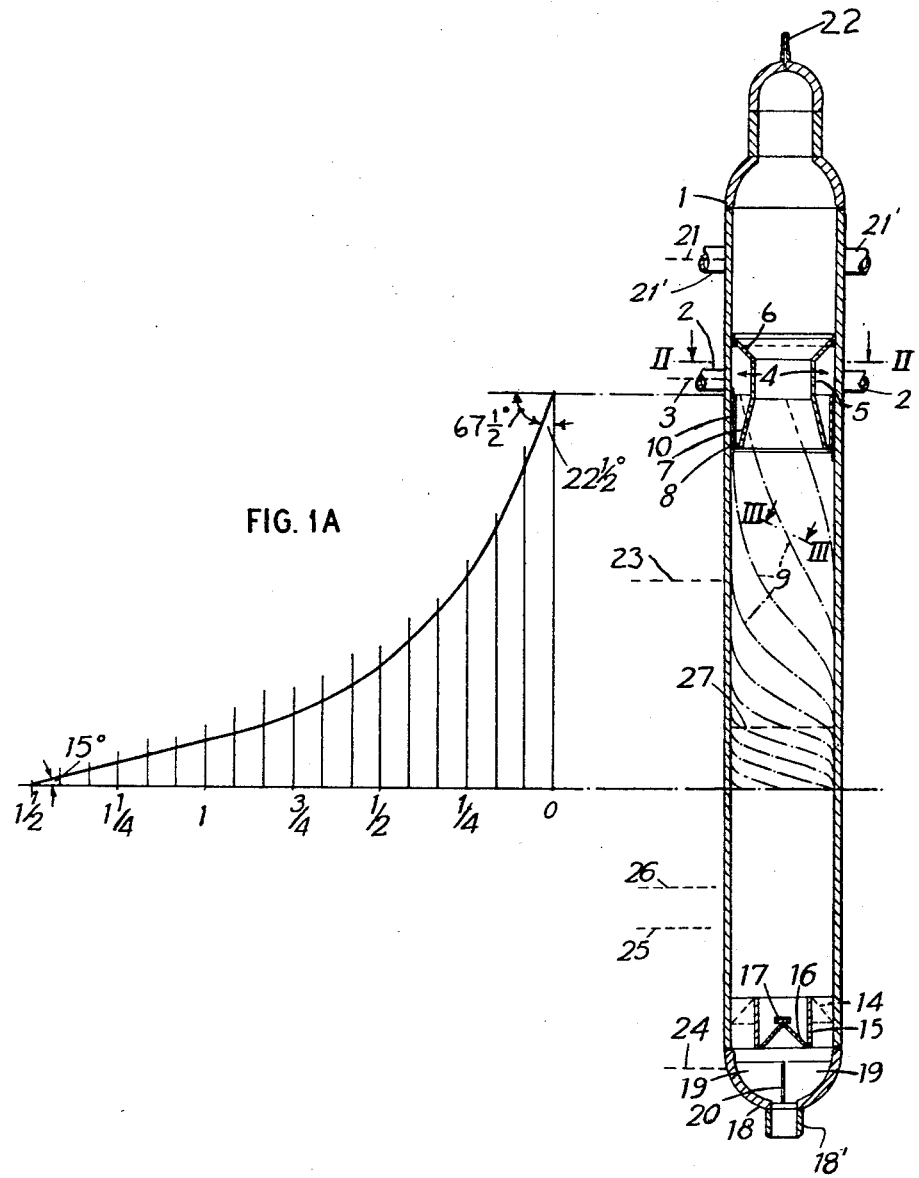
Figure 2:
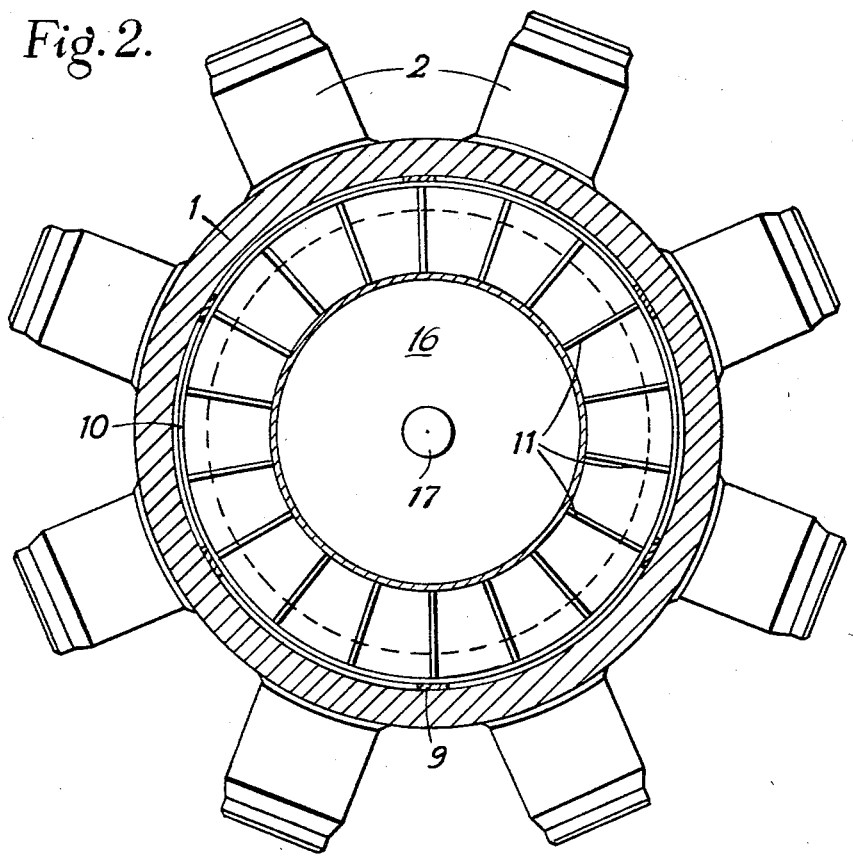
Figure 3:
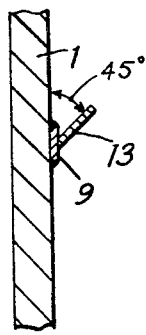

An embodiment of the invention will now be described, by way of example only, with reference to the accompanying drawings, in which FIGURE 1 shows, partly schematically, a sectional elevation of a steam separating apparatus constructed according to the invention; FIGURE 1A is a planar development of the three dimensional curved chutes of the separator; FIGURE 2 shows a section on the line II—II of FIGURE 1; and FIGURE 3 shows a section on the line III—III of FGURE 1.

The steam separating apparatus of the drawings is adapted to be positioned in the circuit of a forced flow boiler, and includes an elongated, upright cylindrical pressure vessel 1. Eight mixture inlet nozzles 2 (FIG. 2) are disposed equiangularly around the pressure vessel 1 and discharge radially into the vessel at the level shown by the dotted line 3 (FIG. 1) being connected to receive a mixture of steam and water from the evaporator section of the boiler (not shown). A mixture receiving chamber 4 positioned within the vessel is bounded by an inner cylindrical wall 5 extending co-axially within the vessel at the level of the mixture inlet nozzles 2 and being connected to the vessel wall by an upper frusto-conical plate 6 extending from the upper edge of wall 5 to the wall of the pressure vessel. Extending downwardly from the lower edge of the cylindrical portion of the receiving chamber is a lower frusto-conical plate 7 spaced at the lower edge thereof from the wall of the pressure vessel to define a lower annular outlet 8 from the receiving chamber 4.

Six, equiangularly spaced, helical strips 9 (FIG. 2) are welded flat against the interior of the vessel and extend downwardly, at a decreasing rate of descent to the horizontal, from a location slightly below the mixture inlet nozzles to a lower portion of the vessel. Each strip 9 makes at least one turn, the angle of descent decreasing from the steep angle of 67½° to the horizontal at the upper end thereof to a relatively shollow 15° to the horizontal after one complete turn and continuing downwardly at a constant angle of 15° to the horizontal for the remaining portion. A cylindrical sleeve 10 is positioned with its outer surface attached to the helical strips at the level of the lower frusto-conical plate 7 and eighteen, equiangularly spaced, helical vanes 11 (FIG. 2) are positioned between the cylindrical sleeve 10 and the lower frusto-conical plate at the same steep angle of 67½° to the horizontal, following a direction corresponding to that of top of the helical strips, every third vane 11 being positioned along the center line of a corresponding helical strip 9. Continuing downwardly from the respective vanes, a further helical strip 13, visible only in FIG. 3 is welded to each of the strips 9 at an inclination of 45° to the vessel wall to provide helical chutes of progressively decreasing steepness for constraining the downward flow of water and imparting to it a component of rotation such that the angle of descent decreases progressively downwardly.

To diminish the swirl initiated by the chute, soon after the falling water enters the main body at the bottom of the vessel, it encounters eight uniangularly spaced, flow straightening vanes shown schematically at 14, which are positioned at the base of the vessel and extend between the wall of the vessel and a short cylindrical member 15 disposed co-axially within the vessel. The base of the short cylindrical member is closed with an upwardly tapering conical end piece 16 provided with a cap 17 at the apex. Each of the flow straightening vanes 14 includes an upper portion inclined at an angle of 60° to the horizontal in the opposite direction to the direction of twist of the helical strips, and a lower, vertically disposed, portion. Below the flow straightening vanes, and in a domed end closure 18 of the vessel, there is provided a vortex eliminator in the form of a pair of vertically extending, diametrically disposed crossed plates one, 19, of which lies in the plane of the drawing, while the other can be seen edge on only at 20. The central portion of the domed lower end closure is apertured to provide a water outlet 18 which is connected to the recirculating pump or pumps (not shown).

Eight steam outlet apertures are provided in the cylindrical wall of the pressure vessel above the receiving chamber at a level shown by the dashed line 21 and are connected to the steam superheating section (not shown) of the boiler. An air release connection 22 is provided in an upper end closure of the vessel and tappings for water level determination are provided at suitable levels shown by the dashed lines 23, 24, over the length of the vessel. A recirculated water connection opens into the vessel at a level 25 slightly above the flow straightening vanes and serves to provide a secondary recirculation path through the pump when the main outlet valve from the pump is in the closed position. A blowdown outlet connection is provided in the vessel wall at a level 26 slightly above the recirculated water inlet connection. Suitably each of the inlet and outlet connections, nozzles and tappings are provided with thermal sleeves.

It is intended that the normal water level in the vessel be about the level shown by the dashed line 27, so that the chute normally projects somewhat below water.

In operation, a mixture of steam and water, is discharged from the evaporating section of the boiler through the radial inlet nozzles 2 into the receiving chamber 4 wherein it strikes the wall 5, preferably with considerable impact. The eighteen vanes 11 in the lower portion of the receiving chamber and the lower conical plate 7 constrain the fluid to swirl downwardly at an inclination to the vertical and at increasing speed, to the lower annular outlet 8 of the receiving chamber. Liquid then continues to follow helical downward flow paths, over the cylindrical wall of the vessel at a decreasing angle with the horizontal as determined by the chutes of FIGURE 3. The water level in the separator is ideally adjusted so that the normal water level 27 is at the level at which each chute has made a complete single turn and the water flows smoothly into the body of water maintained in the lower portion of the vessel. The flow straightening vanes 14 at the lower portion of the vessel and the vortex eliminator plates 19, 20, both serve substantially to reduce the swirling motion induced in the body of water by the water being discharged therein.

It has been found experimentally that separation of the steam from the water occurs largely upon impact of the mixture on the inner cylindrical wall 5 of the receiving chamber 4 and the flow through the vanes 11 in the lower portion of the receiving chamber consists of largely separate streams of water and steam. Further separation of steam from the water occurs during the downward helical motion of the streams of water down strips 9, 13 under the influence of both gravitational and centrifugal forces. Separated steam is discharged upwardly through the space defined within the inner wall 5 to the upper portion of the vessel and to the steam outlet nozzles.

During start-up, at low rates of steam generation, water tends to be carried over from the evaporation section of the boiler so that the separator vessel will tend to fill with water and it is necessary to operate the blow-down valve at level 26 and drain water from the vessel. When the boiler is operating without recirculation of water, the heat imparted to the fluid in the evaporating section of the boiler is sufficient to ensure complete evaporation of the water and steam alone is discharged to the vessel.

The relatively long helical paths followed by the streams of water from discharge from the lower annular outlet of the receiving chamber to the body of water in the vessel ensure that substantially all of the steam bubbles are separated from the water streams prior to entry into the body of water. The relatively flat angle of discharge of the chutes into the body of water in the vessel makes for a relatively smooth flow of water and reduces or avoids re-entrainment of the steam in the vessel. The resultant decrease in surface foaming makes it easier to make precise water level determinations, which is possibly of importance when automatic control is envisaged.

What is claimed is:

1. Apparatus for separating gas from liquid comprising walls forming an upwardly elongated pressure vessel of circular horizontal cross-section having a separated liquid outlet at the bottom and a separated gas outlet in the upper portion thereof, annular wall means forming with the interior wall surface of said vessel an annular separating chamber intermediate the height of said pressure vessel, a circumferential lower end portion of said annular chamber walls means spaced inwardly from the wall of said pressure vessel to define a circumferential outlet from said chamber, means forming a gas-liquid mixture inlet into said separating chamber, said annular chamber having a plurality of generally vertical vanes positioned between said gas-liquid inlet means and said chamber outlet, means for discharging separated gas downwardly from said chamber and upwardly through said vessel past said annular separating chamber and through said gas outlet, means for maintaining a liquid level in said vessel beneath said chamber, and means for discharging separated liquid downwardly from said separating chamber including guide means forming an extension of a plurality of said vanes, said vanes having a downwardly decreasing vertical component to terminate beneath said liquid level for guiding said separated liquid with the angle of liquid descent decreasing downwardly to a substantially horizontal component of motion upon discharge.

2. Apparatus according to claim 1 wherein the wall of said pressure vessel is of circular cylindrical form adjacent the guide means, and said guide means follows a helical course substantially down said wall, being attached thereto.

3. Apparatus according to claim 2 wherein the guide means comprises a first helical strip attached face-on to said wall and a second helical strip attached edge-on to the other face of the first helical strip along its length so as to slope upwards from the helix of attachment.

4. An apparatus according to claim 1 wherein said helical guide means describes a complete revolution before it passes beneath the normal liquid level of the vessel.

References Cited

UNITED STATES PATENTS

| 1,873,332 | 2/1933 | Raymond | 55—204 |
| 2,082,863 | 6/1937 | Weisgerber | 55—207 |
| 2,346,005 | 4/1944 | Bryson | 55—459 X |
| 2,582,423 | 1/1952 | Foley | 55—449 X |
| 2,806,551 | 9/1957 | Heinrich | 55—456 X |
| 2,921,646 | 1/1960 | Poole | 55—416 X |

REUBEN FRIEDMAN, *Primary Examiner.*

R. W. BURKS, *Assistant Examiner.*